Patented Nov. 8, 1949

2,487,394

UNITED STATES PATENT OFFICE 2,487,394

UREA-FORMALDEHYDE-FURFURYL ALCOHOL RESINS

Robert F. Stierli, Newton, N. J., assignor to Harvel Research Corporation, a corporation of New Jersey No Drawing. Application April 27, 1946, Serial No. 665,640

4 Claims. (Cl. 260—45.2)

This invention relates to novel compositions of matter as well as to methods for preparing the same. In one of its more specific aspects this invention relates to novel combinations prepared with (a) organic condensation reaction products of formaldehyde with furfuryl alcohol and/or (b) organic condensation products of formaldehyde with fusible acid condensation polymerization products of furfuryl alcohol.

The furfuryl alcohol-formaldehyde condensation products are resinous and are fully described in U. S. Patent to M. T. Harvey, No. 2,343,972 of March 14, 1944. As set forth in said patent, fusible thermosetting resins may be produced by reacting furfuryl alcohol and formaldehyde in the presence of an acidic agent in such amount that the pH of the mixture of furfuryl alcohol and formaldehyde is between about 1.5 and 3.5 and preferably between about 3 and 3.5 and with the mole ratio of the quantity of furfuryl alcohol to the quantity of the formaldehyde being preferably between 1 to ½ and 1 to 3. The reaction is preferably carried out by the use of external heat and the mixture is preferably boiled under a reflux condenser until a fusible thermosetting resin of the desired viscosity is produced. Then the pH of the resin may be increased above 3.5 to any desired value, even as high as 14 so that the same is stable. For a full and complete description of said resinous organic condensation products and to methods for preparing them, reference is hereby made to said patent which is hereby made part hereof.

The acid condensation products of formaldehyde-acid condensation polymerization products of furfuryl alcohol are resinous and are fully described in U. S. Patent to M. T. Harvey No. 2,343,973 of March 14, 1944. As set forth in said patent, fusible thermosetting resins may be produced by reacting under acid conditions wherein the pH is not less than that obtained in a solution of 2 cc. of concentrated hydrochloric acid in 60 cc. of distilled water, formaldehyde and fusible resinous acid condensation-polymerization products of furfuryl alcohol. The preferred pH of said acidic mixture is preferably not less than 1 and the ratio of the reactants in said mixture is preferably such that for every 100 parts by weight of an acid condensation-polymerization product of furfuryl alcohol there is between about 7½ to 100 parts of formaldehyde. In practice, the reaction is preferably carried out by heating the acidic mixture to boiling under a reflux condenser until there is produced a fusible thermosetting resin of the desired viscosity. Then the pH of the resin is increased above about 3.5 and to any desired value, even as high as 14 so that the same is stable. For a full and complete description of said resinous organic condensation products and to methods for preparing them, reference is hereby made to said patent which is made part hereof.

In the course of my experimentation with said fusible thermosetting resins I have discovered that they may be considerably improved for certain purposes. By practising this invention said thermosetting resins may be so modified as to have good adhesion characteristics and fast initial setting characteristics at room temperature and at a pH of no less than 3 which modified resins in their final or thermoset state have high water, alkali and acid resistance characteristics.

Briefly, this invention consists in reacting a mixture consisting of one of said fusible resins, urea and formaldehyde with the ratio by weight of said resin to said urea being between about 100 to 45 and 100 to 10 and preferably between about 100 to 35 and 100 to 25 and the ratio by weight of said fusible resin to said formaldehyde being between about 100 to 10 and 100 to 80. The viscosity of said fusible resin in said mixture is usually between about 30 to 200 and preferably 30 to 70 centipoises at 25° C. The formaldehyde in said mixture is preferably in aqueous solution. After said mixture has been made, having a pH between 3 and 6, it is agitated and while maintained in this state of agitation, external heat is applied to the reaction container to boil the mixture and maintain said mixture in the state of boiling until a fusible resinous composition of any desired viscosity above 100 centipoises at 25° C. is obtained. For one of the purposes of this invention, the boiling and agitation are terminated and the resultant mass is quickly chilled when a chilled sample thereof has a viscosity at 25° C. of about 100 to 500 centipoises. The product so produced is of brushable consistency and finds application in the fields of coatings, impregnation and laminations. These novel products may be employed in closed assembly lamination by merely adjusting the pH of the same to the proper value and no lower than 3. After said products are produced, there may be added thereto a quantity of aniline or potassium carbonate or the like to increase the pH thereof to between 7 and 8 or above so that the resultant product is stable for at least 3 months. The aniline serves not only to raise the pH but may react with the excess formaldehyde thus to reduce the amount of volatiles during curing. In practice, such a shelf-life stabilized product may have added thereto a quantity of an acidic agent such as a dilute mineral acid, diethyl sulphate or the like whereby the pH thereof is adjusted to a value between about 2 and 4. Then this product which has good pot life characteristics, at least 8 hours, and is of brushable consistency, may be applied to a face of an article to be coated, impregnated or laminated. When used as a laminating medium, the closed assembly technic may be used and this medium has a fast initial setting time at room temperature and is particularly useful with wood layers in providing good adhesion characteristics which are superior to those of said prior art resins, the water; alkali and acid resistance of the novel products are far superior to the corresponding characteristics of urea-formaldehyde resins. After the initial setting at room temperature, the so-treated product may be allowed to remain at room temperature until finally cured or this final curing may be accelerated by heat.

The following is a typical example of the invention and is set forth merely to illustrate the same and not by way of limitation.

*Example*

200 parts by weight of a fusible thermosetting resin made according to the teachings of U. S. Patent 2,343,972 or 2,343,973 and having a viscosity of 40 to 60 centipoises at 25° C. is placed in a container. Then there are added thereto 60 parts by weight of urea and 100 parts by weight of an aqueous solution of formaldehyde (containing 37.5% formaldehyde). This mixture whose pH is between 3 and 6 due to the acid employed in making the resin and still present, is agitated and is heated to boiling under a reflux condenser and maintained in this state of boiling for a period of approximately one-half hour. It is then rapidly cooled to room temperature. Then there is added thereto about 3 parts by weight of anhydrous potassium carbonate so that the pH of the product is adjusted to between 7 and 8. The resultant pH-adjusted resin is stable and may be stored for any commercially practical period of time before application. When the same is to be applied there may be added thereto 1 to 6 grams of diethyl sulphate to produce a cold setting combination having a pot life of at least 8 hours, good adhesion to wood, paper, cloth, etc., and fast initial setting time at room temperature.

Having thus described my invention, what I claim and desire to protect with Letters Patent is:

1. The method for producing a fusible resinous composition comprising reacting by heating a mixture of formaldehyde, urea and a normally liquid fusible resinous composition selected from the group consisting of furfuryl alcohol-formaldehyde acid condensation products and acid condensation products of formaldehyde with fusible acid condensation polymerization products of furfuryl alcohol, the viscosity of said fusible resinous composition being in the range of 30 to 200 centipoises at 25° C., the ratio by weight of said fusible resinous composition to said formaldehyde being in the range of 100 to 10 and 100 to 80 and the ratio by weight of said fusible resinous composition to said urea being in the range of 100 to 45 and 100 to 10, the pH of said mixture being in the range of 3 to 6.

2. The method comprising heating a mixture of aqueous formaldehyde containing 37.5% formaldehyde, urea and a normally liquid fusible resinous composition selected from the group consisting of furfuryl alcohol-formaldehyde acid condensation products and acid condensation organic products of formaldehyde with fusible acid condensation polymerization products of furfuryl alcohol, the viscosity of said fusible resinous composition being in the range of 30 to 200 centipoises at 25° C., the ratio by weight of said fusible resinous composition to said formaldehyde being in the range of 100 to 10 and 100 to 80 and the ratio by weight of said fusible resinous composition to said urea being in the range of 100 to 45 and 100 to 10, the pH of said mixture being in the range of 3 to 6, said heating continued until a chilled sample of the reaction mass has a viscosity at 25° C. of greater than 100 centipoises.

3. A fusible resinous composition produced according to claim 1.

4. A fusible resinous composition produced according to claim 2.

ROBERT F. STIERLI.

REFERENCES CITED

The following references are of record in the file of this patent:

UNITED STATES PATENTS

| Number | Name | Date |
|---|---|---|
| 2,335,701 | Root | Nov. 30, 1943 |
| 2,343,973 | Harvey | Mar. 14, 1944 |